United States Patent
Bitra et al.

(10) Patent No.: US 10,090,926 B2
(45) Date of Patent: Oct. 2, 2018

(54) VISIBLE LIGHT COMMUNICATION

(71) Applicant: QUALCOMM Incorporated, San Diego, CA (US)

(72) Inventors: Suresh Kumar Bitra, Mangalagiri (IN); Meghna Agrawal, Sunnyvale, CA (US); Sreekanth Hosahudya Venkataramanappa, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 15/423,225

(22) Filed: Feb. 2, 2017

(65) Prior Publication Data

US 2018/0219623 A1   Aug. 2, 2018

(51) Int. Cl.
*H04B 10/116*   (2013.01)

(52) U.S. Cl.
CPC .................................. *H04B 10/116* (2013.01)

(58) Field of Classification Search
CPC . H04B 10/1149; H04B 10/11; H04B 10/1121; H04B 10/1143; H04B 10/114; H04B 10/116
See application file for complete search history.

(56) References Cited

U.S. PATENT DOCUMENTS

| 2010/0215378 A1 | 8/2010 | Rajagopal et al. |
| 2012/0281987 A1 | 11/2012 | Schenk et al. |
| 2014/0241730 A1 | 8/2014 | Jovicic et al. |
| 2014/0270796 A1 | 9/2014 | Jovicic et al. |
| 2015/0065046 A1 | 3/2015 | Wilfred et al. |
| 2015/0311977 A1 | 10/2015 | Jovicic et al. |
| 2016/0191158 A1* | 6/2016 | Aoyama ............ H04B 10/1149 398/172 |

FOREIGN PATENT DOCUMENTS

| WO | 2015193042 A1 | 12/2015 |
| WO | 2016001972 A1 | 1/2016 |

OTHER PUBLICATIONS

International Search Report and Written Opinion—PCT/US2017/062668—ISA/EPO—dated Feb. 22, 2018.

* cited by examiner

*Primary Examiner* — Ted Wang
(74) *Attorney, Agent, or Firm* — Hunter Clark PLLC

(57) ABSTRACT

An example of a method of processing visible light signals includes determining a property of light received from a light source at a device; determining a mode of operation of the device based on the property of the light, the mode of operation corresponding to a color discrimination capability of at least one image sensor of the device; detecting the light, using the at least one image sensor in the determined mode of operation, to produce a plurality of detection signals, the at least one image sensor including a plurality of pixels and each detection signal of the plurality of detection signals being associated with a respective pixel of the plurality of pixels; and extracting information from the plurality of detection signals.

30 Claims, 6 Drawing Sheets

VISIBLE LIGHT COMMUNICATION

BACKGROUND

Visible Light Communication (VLC) is a technique for communicating information using visible light. There are several advantages to using VLC over conventional wireless communication that relies on radio frequency (RF) signals. First, the visible light spectrum (with wavelengths in the range 380 nm to 780 nm) is not regulated or restricted for use by regulatory agencies. Second, the visible light spectrum is less "crowded" than the available RF spectrum because visible light is local and does not permeate physical obstacles, such as buildings and walls. Thus, unlike RF signals, which can interfere with other RF signals in the general vicinity, VLC signals from a VLC light source only interfere with other visible light sources that are within a line of sight of a device receiving the VLC signal. Third, a VLC receiver can determine the location of the source of the VLC signal using an image sensor. Thus, a device that includes a VLC receiver can use the VLC signal to determine the position of the device indoors where RF signals from global positioning systems can be unreliable. Fourth, VLC light sources can be included in existing light fixtures that produce lighting in indoor and outdoor spaces because humans cannot perceive the modulation of the light source used to encode information in the VLC signals.

VLC signals can be encoded in various ways. One particular example is pulse width modulation (PWM) in which information is encoded by turning on and off the light source using a number of cycles per second that his greater than human eyes can perceive (e.g., greater than 150 Hz). Information encoded in the VLC signals can be used in different ways, including determining the position of the device that receives the VLC signals.

SUMMARY

An example of a method of processing visible light signals includes determining a property of light received from a light source at a device; determining a mode of operation of the device based on the property of the light, the mode of operation corresponding to a color discrimination capability of at least one image sensor of the device; detecting the light, using the at least one image sensor in the determined mode of operation, to produce a plurality of detection signals, the at least one image sensor including a plurality of pixels and each detection signal of the plurality of detection signals being associated with a respective pixel of the plurality of pixels; and extracting information from the plurality of detection signals.

Implementations of such a method may include one or more of the following features. Determining the mode of operation may include determining whether to use a monochrome mode or a multi-color mode. The at least one image sensor may include a monochrome image sensor and a multi-color image sensor. Detecting the light using the at least one image sensor in the monochrome mode may include detecting light with the monochrome image sensor. Detecting the light using the at least one image sensor in the multi-color mode may include detecting light with the multi-color image sensor. Determining the property of the light may include measuring a brightness of the light using the at least one image sensor. The method may further include comparing a brightness of a first set of pixels associated with the light source with an average brightness of a second set of pixels.

Implementations of such a method may also include one or more of the following features. Determining the property of the light may include determining a color of the light. Determining the property of the light may include receiving an indication of the color of the light in assistance data received via a wireless transceiver of the device. Determining the property of the light may include determining the color of the light using the at least one image sensor. The at least one image sensor may include a multi-color image sensor that includes a first set of pixels configured to detect light of a first color and a second set of pixels configured to detect light of a second color. Determining the mode of operation may include determining whether to enable the first set of pixels and disable the second set of pixels, or to enable the second set of pixels and disable the first set of pixels. Determining the property of the light may include capturing an image with the at least one image sensor; determining, based on the image, a first portion of the image associated with the light source and a second portion of the image that is not associated with the light source; and determining the property of the light based on the first portion of the image.

An example of a device to process visible light signals includes at least one image sensor configured to detect light from a light source in a mode of operation and generate a plurality of detection signals, the at least one image sensor including a plurality of pixels and each detection signal of the plurality of detection signals being associated with a respective pixel of the plurality of pixels; and a processor, communicatively coupled to the at least one image sensor. The processor is configured to determine a property of the light; determine the mode of operation of the device based on the property of the light, the mode of operation corresponding to a color discrimination capability of the at least one image sensor of the device; and extract information from the plurality of detection signals.

Implementations of such a device may include one or more of the following features. The processor may be configured to determine the mode of operation by determining whether to use a monochrome mode or a multi-color mode. The at least one image sensor may include: a monochrome image sensor configured to detect the light in response to a determination by the processor to use the monochrome mode; and a multi-color image sensor configured to detect the light in response to a determination by the processor to use the multi-color mode. The processor may be configured to determine the property of the light by determining a brightness of the light based on the plurality of detection signals received from the at least one image sensor. The processor may be further configured to compare a brightness of a first set of pixels associated with the light source with an average brightness of a second set of pixels.

Implementations of such a device may also include one or more of the following features. The processor is configured to determine the property of the light by determining a color of the light. The device may include a wireless transceiver configured to receive assistance data that includes an indication of the color of the light. The processor may be configured to determine the color of the light based on the indication of the color of the light. The processor may be configured to determine the property of the light by determining the color of the light based on the plurality of detection signals received from the at least one image sensor. The at least one image sensor may include a multi-color image sensor that includes a first set of pixels configured to detect light of a first color and a second set of pixels configured to detect light of a second color. The processor may configured to determine the mode of operation by determining whether to enable the first set of pixels and disable the second set of pixels, or to enable the second set of pixels and disable the first set of pixels.

An example of a device to process visible light signals includes property determining means for determining a property of light received from a light source; mode determining means for determining a mode of operation of the device based on the property of the light; detection means for detecting the light in the mode of operation and for generating a plurality of detection signals, the detection means including a plurality of pixels and each detection signal of the plurality of detection signals being associated with a respective pixel of the plurality of pixels, the mode of operation corresponding to a color discrimination capability of the detection means; and extracting means for extracting information from the plurality of detection signals.

Implementations of such a device may include one or more of the following features. The mode determining means may be for determining whether to use a monochrome mode or a multi-color mode. The property determining means may be for determining the property of the light based on the plurality of detection signals received from the at least one image sensor. The device may further include receiving means for receiving assistance data that includes an indication of the property of the light. The property determining means may be for determining the property of the light based on the indication of the property of the light. The property of the light may be one of a brightness of the light or a color of the light. The detection means may include a monochrome detection means for detecting the light in response to a determination by the mode determining means to use a monochrome mode; and a multi-color detection means for detecting the light in response to a determination by the mode determining means to use a multi-color mode.

An example of a non-transitory, processor-readable storage medium includes processor-readable instructions configured to cause a processor of a device to determine a property of light received from a light source; determine a mode of operation of the device based on the property of the light, the mode of operation corresponding to a color discrimination capability of at least one image sensor of the device; control the at least one image sensor to detect the light received from the light source in the determined mode of operation; receive a plurality of detection signals from the at least one image sensor, the at least one image sensor including a plurality of pixels and each detection signal of the plurality of detection signals being associated with a respective pixel of the plurality of pixels; and extract information from the plurality of detection signals.

Implementations of such a non-transitory, processor-readable storage medium may include one or more of the following features. The instructions configured to cause the processor to determine the mode of operation may include instructions configured to cause the processor to determine whether to use a monochrome mode or a multi-color mode. The instructions configured to cause the processor to determine the property of the light may include instructions configured to cause the processor to determine the property of the light based on the plurality of detection signals received from the at least one image sensor. The instructions configured to cause the processor to determine the property of the light may include instructions configured to cause the processor to determine the property of the light based on assistance data comprising an indication of the property of the light received from a wireless transceiver of the device.

BRIEF DESCRIPTION OF THE DRAWINGS

Non-limiting and non-exhaustive examples of methods and systems are described with reference to the following figures. The figures may not be drawn to scale.

DETAILED DESCRIPTION

Figure 1:
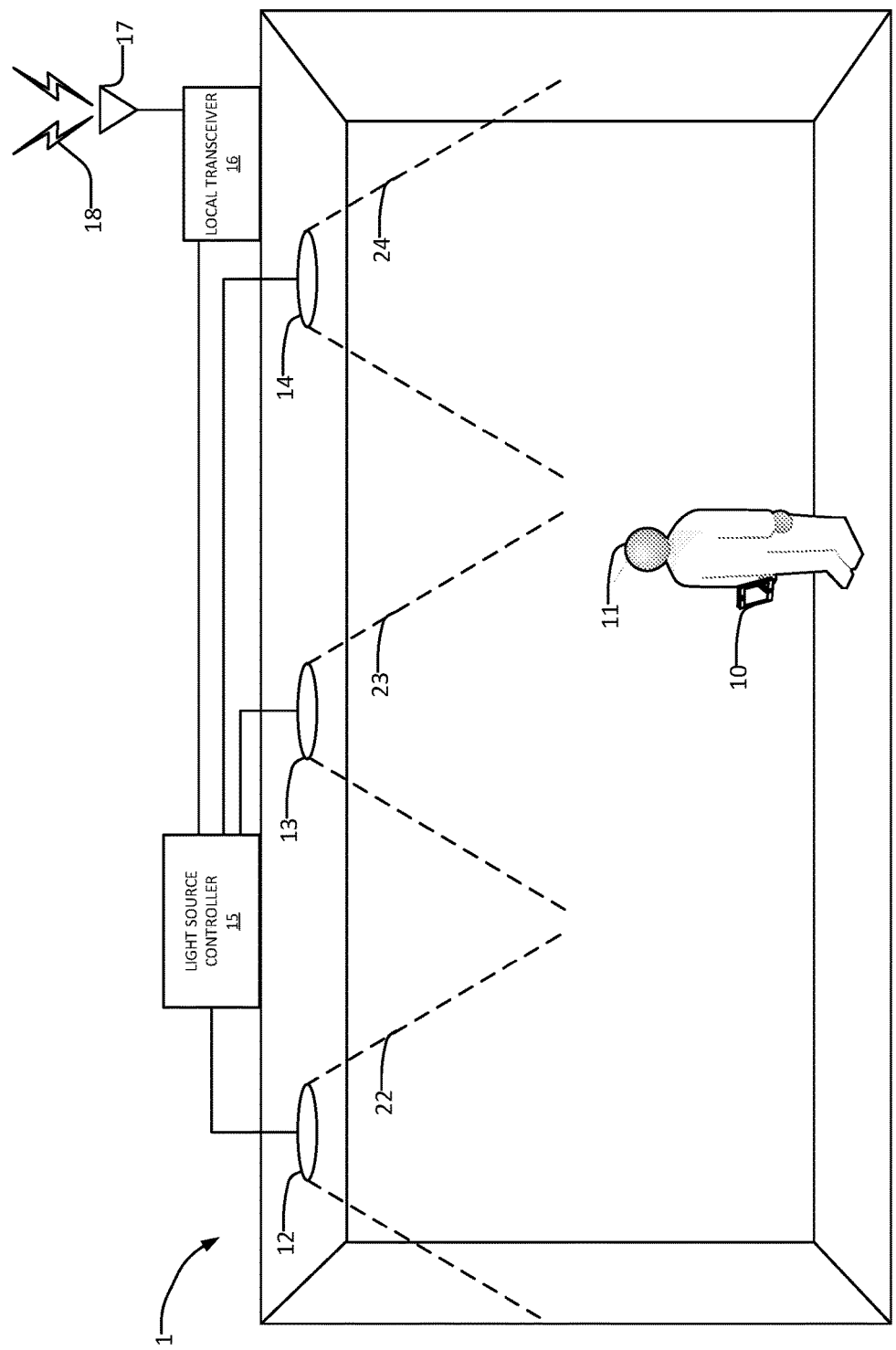
FIG. 1 is a simplified diagram of an example VLC environment.

Items and/or techniques described herein may provide increased power efficiency and increased optical sensitivity when performing VLC. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

The techniques discussed herein include intelligently determining how a device with at least one image sensor operates to detect a VLC signal. Intelligently controlling and operating the at least one image sensor can improve the power consumption and sensitivity of the device. Reduced power consumption is desirable for increasing the battery life of a mobile device, and increased sensitivity increases the ability of the device to detect VLC signals that would otherwise be difficult to detect.

The device used to detect a VLC signal may be a mobile device, such as a cellular phone or tablet. Mobile devices may be equipped with multiple image sensors for taking photographs. For example, a mobile device can include a multi-color image sensor (e.g., a red-green-blue (RGB) image sensor), capable of capturing color images, and a monochrome image sensor, capable of capturing only greyscale images. Conventionally, only an RGB image sensor is used by the mobile device as a camera for capturing images. However, recent developments in photographic processing in mobile devices have made it desirable to also use a monochrome image sensor in combination with the RGB sensor to create photographic images with increased clarity and sharpness. Thus, mobile devices with multiple cameras that have different color discrimination capabilities are becoming more common place. Herein, color discrimination capability refers to the ability of an image sensor to discriminate between light of different colors. For example, a monochrome image sensor is not able to distinguish between different colors of light, whereas a multi-color image sensor is capable of distinguishing between two or more colors of light. Additionally, selectively enabling and disabling certain color pixels of a multi-color sensor changes the color discrimination capability of the multi-color sensor.

Conventionally, mobile devices that are configured to perform VLC signal detection use the image sensor that is the default image sensor for taking photographic images. The default image sensor is typically the multi-color image sensor. A mobile device may, for example, use the multi-color image sensor to record images (e.g., photographs or videos) while simultaneously performing VLC with the same sensor. Using the single multi-color image sensor for both tasks is more power efficient than using the multiple-color image sensor for recording images and using the monochrome image sensor for performing VLC. There are, however, situations where VLC may not be able to be performed well using the default image sensor. Thus, techniques are discussed herein for the mobile device to be configured to determine which image sensor to use, in response to a determination of a property of the light used for VLC. For example, the mobile device may use the monochrome image sensor when the brightness of the VLC light decreases below a certain threshold. Monochrome image sensors are more sensitive to variations in the VLC light than multi-color sensors because monochrome image sensors do not filter colors of light prior to detection by the photodetectors of the sensors. As another example, the mobile device may select which pixels of a multi-color image sensor to use to sense VLC light. The light used for VLC may be colored light. Thus, the sensitivity of a multi-color image sensor may be increased by selectively operating pixels of the image sensor that detect the color light that most closely matches the color of the VLC light.

Referring to FIG. 1, a VLC environment 1 includes light sources 12-14 for communicating information to a mobile device 10 of a user 11. The light sources 12-14 are light fixtures that provide light 22-24, respectively, for illuminating the VLC environment 1. The light 22-24 emitted from the light sources 12-14 is broad spectrum light, which may have different spectral characteristics based on the preferences of the user 11. For example, the light 22-24 may have spectra that closely emulate incandescent light fixtures, fluorescent light fixtures or sunlight. The light sources 12-14 may include one or more light emitting diodes (LEDs) that individually, or collectively, emit light with the desired spectral properties.

While one purpose of the light sources 12-14 is to provide general illumination for humans (e.g., the user 11) in the VLC environment 1, the light 22-24 emitted from the light sources 12-14 is also encoded with information for use in VLC. The light sources 12-14 are communicatively coupled to a light source controller 15, which controls the information encoded in the light 22-24. The light source controller 15 may be connected to the light sources 12-14 via a wired connection or a wireless connection. The information from the light sources 12-14 is encoded in the light 22-24 in a way that does not compromise the lighting function of the light sources 12-14 by not creating a significant or possibly even noticeable visual difference to the user 11. LEDs, for example, can be modulated at frequencies that are high enough that no noticeable flicker is observed by the user 11 (e.g., intensity modulation with frequencies in the 1-5 KHz range). The light sources 12-14 include LED drivers capable of performing pulse width modulation (PWM) at these frequencies. PWM is a conventional technique used for dimming LED light fixtures in response to a dimmer switch controlled by a user. Thus, by encoding VLC information using PWM, the VLC light sources 12-14 are similar to many of the standard PWM techniques already used for dimming LED light fixtures.

The VLC information can be encoded in the full spectrum of the light 22-24 or a portion of the spectrum of the light 22-24. For example, if the light source 12 is a white light source, the PWM of the light 22 may be a modulation of all colors in the white light simultaneously. Alternatively, only a portion of the light 22 may be modulating using PWM. By way of example and not limitation, the light source 12 may include multiple colored LEDs that together act as a white light source. In a multiple colored LED implementation, one or more of the colors may be encoded with a VLC signal while one or more of the other colors are not encoded with a VLC signal. In an example where the light source 12 includes a red LED, a blue LED and a green LED, the green LED may be modulated using PWM to encode information while the blue LED and the red LED may not have any VLC information encoded therein.

The information encoded in the light 22-24 can be information that the owner or operator of the VLC environment 1 wants to communicate to the device 10. This information may be advertising information related to the business that controls the light sources 12-14. The VLC information encoded in the light 22-24 may include an identifier of the light source 12-14. For example, light fixture 12 encodes the light 22 with a first identifier, light fixture 13 encodes the light 23 with a second identifier, and light fixture 14 encodes the light 24 with a third identifier.

Information in the light 22-24 may be used by the device 10 for one or more of a variety of purposes, e.g., for determining the position of the device 10. The mobile device 10 may use the identifiers, in connection with mapping data that indicates the location of each identifier within the VLC environment 1, to determine the location of the device 10. The mapping data can include locations of the light sources 12-14 so that the mobile device 10 can use the identifiers, measured ranges and/or angles to the light sources 12-14 and the locations of the light sources 12-14 to determine the location of the device 10.

The mapping data that identifies the locations of the light sources that encode light with particular identifiers can be sent to the phone using a local transceiver 16. The local transceiver 16 may be a transceiver station (BTS), a Node B, an evolved NodeB (eNB), a Wi-Fi access point (AP), a femtocell, a Home Base Station, a small cell base station, a Home Node B (HNB) or a Home eNodeB (HeNB) and may provide access to a wireless local area network (WLAN, e.g., IEEE 802.11 network), a wireless personal area network (WPAN, e.g., Bluetooth® network or ZigBee® network) or a cellular network (e.g. an LTE network or other wireless wide area network). The local transceiver 16 uses an antenna 17 for transmitting information, including the mapping data, to the mobile device via wireless signal 18. This information may be referred to as assistance data because this information assists the device 10 in performing positioning techniques using VLC signals. In this way, the device 10 is capable of performing indoor positioning without receiving satellite-based positioning signals, which can be difficult to receive indoors leading to imprecise positioning results.

In addition to basing the positioning of the device 10 on the identifiers decoded from one or more light sources, the device 10 can obtain more precise positioning by determining the angle of arrival (AOA) of the light 22 and the light 23 from the light source 12 and the light source 13, respectively. The AOA may be determined using, for example, the shape of a group of pixels corresponding to each of the light sources on the image sensor of the device 10. For example, in FIG. 1, the light 22 incident on the image sensor of the device 10 will appear, from the perspective of the device 10, to have a different shape than the light 23 because the light 22 arrives at the device 10 with a larger angle of incidence than the light 23 which is from the light source 13, which is directly above the device 10. After determining the AOA for each of the light sources, the position of the device 10 within the VLC environment 1 can be more precisely determined than would be possible without the AOA information.

While FIG. 1 illustrates light sources 12-14 as light fixtures within the VLC environment 1, VLC signals can also be transmitted from dedicated VLC light sources (not shown in FIG. 1). Such light sources may provide colored or directional light that is not used for illuminating the VLC environment 1 for user 11. For example, lasers or LEDs may be placed at various locations to improve the VLC capabilities without needing to install additional light fixtures.

Figure 2:
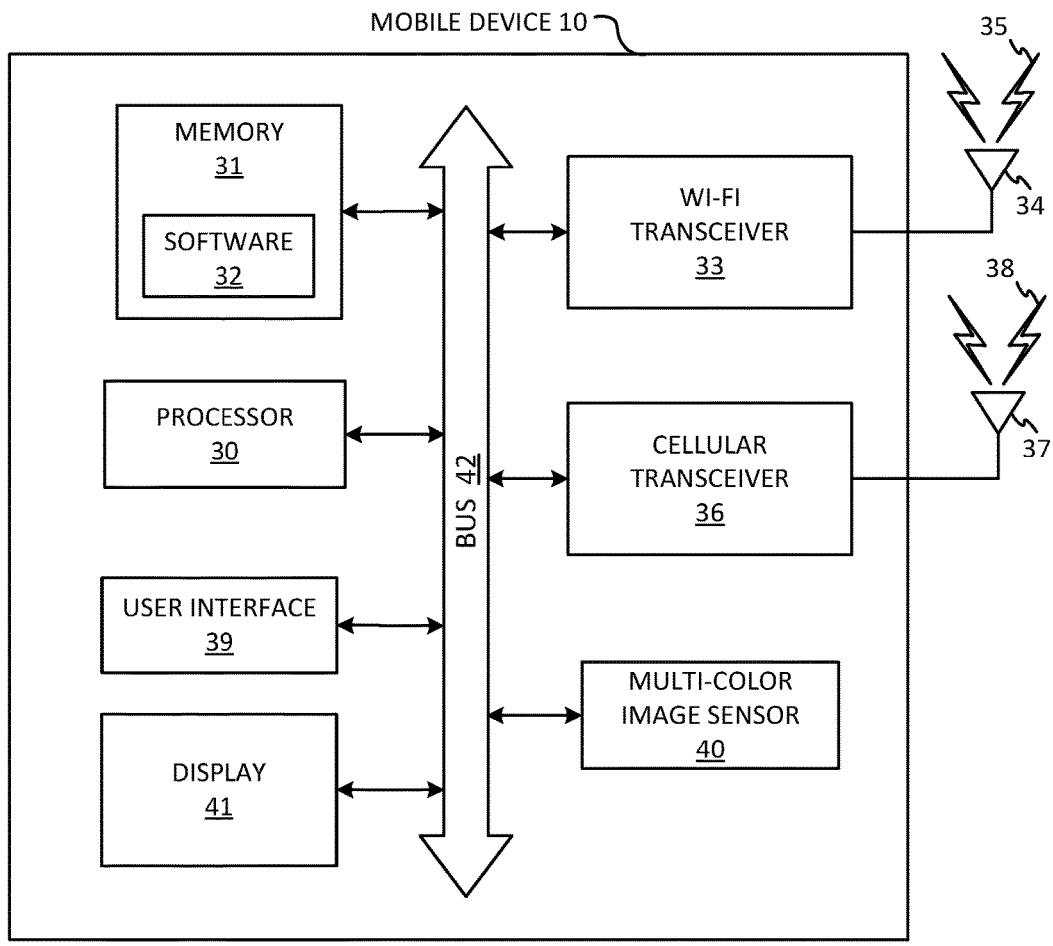
FIG. 2 is a block diagram of an example of a mobile device that operates within the VLC environment of FIG. 1

Referring to FIG. 2, with further reference to FIG. 1, an example of a device 10 includes a processor 30, a memory 31, software 32, a Wi-Fi transceiver 33, a cellular transceiver 36, a user interface 39, a display 41, and an image sensor 40. The device 10 is a computer system that may be a handheld mobile device, such as a mobile phone or smart phone. The Wi-Fi transceiver 33 is configured to communicate with local networks by transmitting and receiving wireless signals 35 via an antenna 34 to and from base stations, such as Wi-Fi APs, femtocells, Home Base Stations, small cell base stations, HNBs or HeNBs. The cellular transceiver 36 is configured to communicate with a cellular communication network by transmitting and receiving wireless signals 38 via an antenna 37 to and from base stations, such as wireless BTSs, Node Bs, eNBs, etc. The processor 30 is an intelligent device, e.g., a central processing unit (CPU) such as those made or designed by Qualcomm®, ARM®, Intel® Corporation, or AMD®, a microcontroller, an application specific integrated circuit (ASIC), etc. The processor 30 may, for example, include an image signal processor (ISP). The memory 31 is a non-transitory, processor-readable memory that stores instructions that may be executed by processor 30 and includes random access memory (RAM), read-only memory (ROM) and non-volatile memory such as flash memory or solid state storage. Software 32 can be loaded onto the memory 31 by being downloaded via a network connection, uploaded from a disk, etc. Further, the software 32 may not be directly executable, e.g., requiring compiling before execution. The software 32 includes instructions configured to cause the processor 30 to perform functions described herein.

The user interface 39 provides a means for the user 11 to input information to the device 10. The user interface 39 may include one or more buttons and/or a touchscreen display. The display 41 may be a liquid-crystal display (LCD) (e.g., a thin-film transistor (TFT) display), although other forms of displays are acceptable. The display 41 can display VLC information, such as advertising information or location information to the user 11 of the device 10. For example, the display 41 may display coordinates and/or a graphical representation of the position of the device 10 on a map. While FIG. 2 illustrates the user interface 39 and the display 41 as separate, they may be the same unit, for example, when the device 10 includes a touchscreen display.

The various components of the mobile device 10 are communicatively coupled to one another via a bus 42, which is configured to transmit information from one component to another component. For example, the processor 30 is communicatively coupled to the image sensor 40 and the memory 31 via the bus 42, which allows the processor 30 to receive image information from the image sensor 40 and allows the processor 30 to control the operation of the image sensor 40.

The image sensor 40, which is described in more detail below in connection with FIGS. 3-4, may include multiple image sensors. In one example, the image sensor 40 includes a multi-color image sensor 45 and a separate and distinct monochrome image sensor 50, which are two separate sensors (e.g., two separate cameras that are part of the mobile device 10). Alternatively, the image sensor 40 may include two multi-color image sensors or two monochrome image sensors. The image sensor 40 includes an array of pixels and a controller for activating and deactivating portions of the array of pixels. In embodiments where the image sensor 40 includes multiple image sensors, the image sensors may include a different number of pixels and/or have different resolutions. The image sensor 40 also includes a photodetector readout circuit for reading out electrical signals from the array of pixels.

Figure 3:
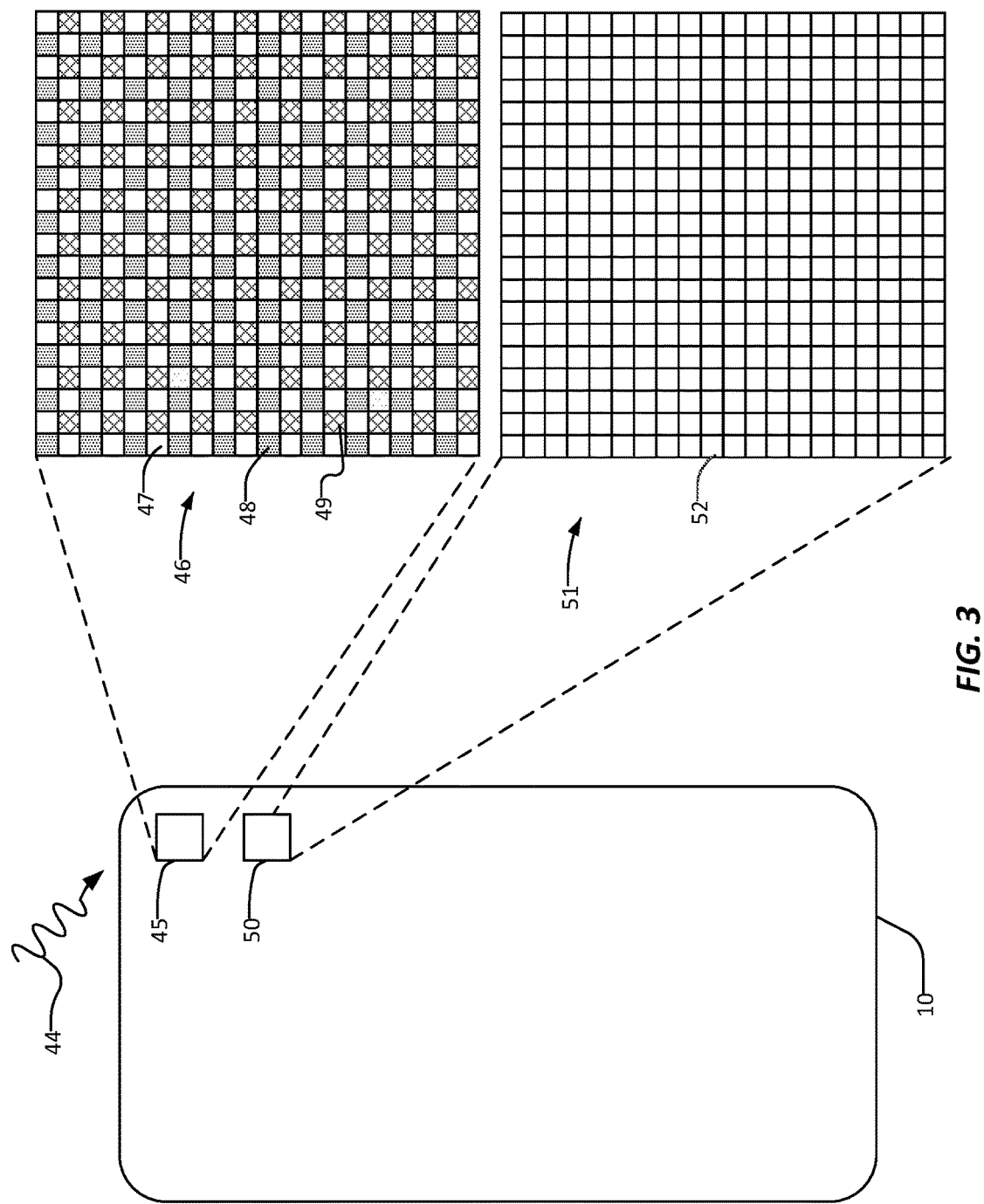
FIG. 3 is a back view of the mobile device of FIG. 2 with two image sensors.

Referring to FIG. 3, with further reference to FIGS. 1-2, the mobile device 10 may include a multi-color image sensor 45 and a monochrome sensor 50 for detecting light 44 received from the light sources 12-14 of the VLC environment 1. The multi-color image sensor 45 includes an array of pixels 46. FIG. 3 illustrates the array of pixels 46 as a 20×20 array but other sizes of arrays of pixels may be used. The array of pixels 46 includes three types of pixels: green pixels 47 (illustrated with no fill pattern), red pixels 48 (illustrated with a dotted fill pattern), and blue pixels 49 (illustrated with a cross-hatched fill pattern). In this example, the number of green pixels 47 is twice the number of red pixels 48 and twice the number of blue pixels 49. However, the multi-color sensor 45 may have equal number of red, green and blue pixels, or another ratio of pixels. Additionally, the colors of the pixels are not limited to red, green and blue pixels or three different colors of pixels. The different color pixels are created by, for example, placing a color filter that transmits (passes) a particular color light over a photodetector of a pixel. For example, a green pixel 47 may include a color filter that transmits green light, but absorbs and/or reflects red and blue light, and a photodetector capable of detecting a broad spectrum of light that includes all three colors. Incident light 44, if it is a green color light, passes through the green color filter and is detected by the associated photodetector.

The monochrome image sensor 50 includes an array of pixels 51. FIG. 3 illustrates the array of pixels 51 as a 20×20 array but other sizes of arrays of pixels may be used. The array of pixels 51 includes a single type of pixel 52 that does not include any color filters and detects a broad spectrum of light, as determined by the spectral response characteristics of the photodetectors associated with the array of pixels 51.

In both the multi-color image sensor 45 and the monochrome image sensor 50, the arrays of pixels 46 and 51 each generate detection signals that contain information about the amount of light detected by each pixel of the respective array. The detection signals are electrical signals output from a photodetector associated with each pixel of the arrays of pixels 46 and 51.

One or both of the image sensors 45 and 50 may be activated at a given time. The processor 30 of the device 10 is configured to determine a mode of operation of the device 10. A first mode of operation may be a multi-color mode where the multi-color image sensor 45 is enabled for use in VLC. A second mode of operation may be a monochrome mode where the monochrome image sensor 50 is used for VLC. When one of the image sensors is being used for VLC, the other image sensor may be disabled to conserve power. Alternatively, both image sensors may be used simultaneously. Additionally, the image sensors may be used for multiple purposes as the same time. For example, the multi-color image sensor 46 can be used by the user 11 to record photographs or videos while the device 10 is simultaneously analyzing the images for VLC signals. The monochrome image sensor 51 can also be used for VLC communication while the user 11 records images or video with the multi-color image sensor 46. As discussed below, the determination of the mode of operation of the device 10 may be made by the processor 30 in response to a determination of a property of the VLC light. For example, if the brightness of the light recorded by the image sensor 40 decreases below a threshold level, the processor 30 controls the device such that it operates in monochrome mode. Additionally, if the color of the light used for VLC is a particular color, the processor 30 may selectively enable pixels of the multi-color image sensor 46 that match the color of the VLC light.

Figure 4:
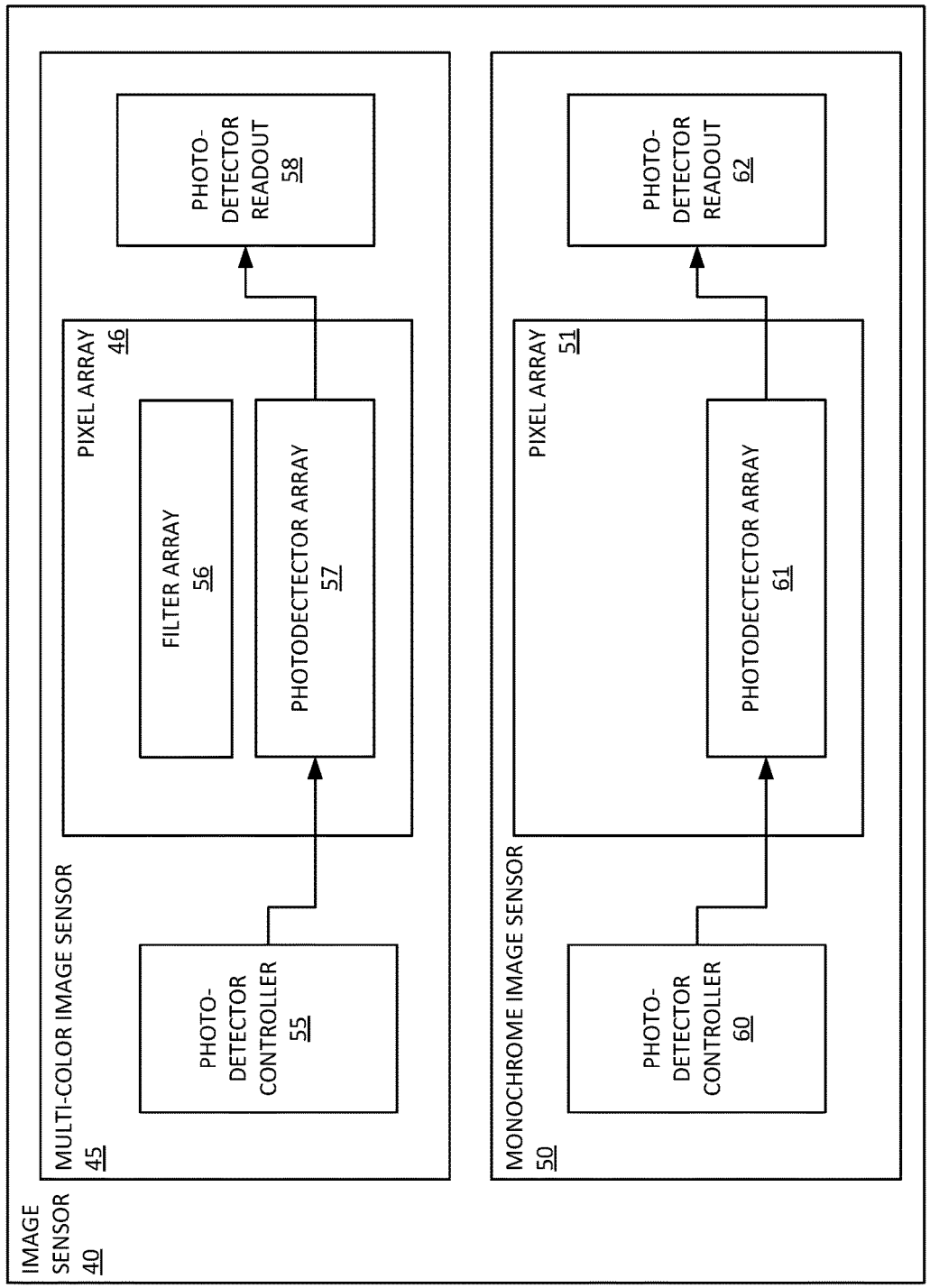
FIG. 4 is a block diagram of an example of the image sensor of FIG. 2.7

Referring to FIG. 4, with further reference to FIGS. 1-3, the image sensor 40 of the mobile device 10 may include the multi-color image sensor 45 and the monochrome sensor 50. The multi-color image sensor 45 includes a photodetector controller 55, the pixel array 46 and a photodetector readout 58. The pixel array 46 includes a photodetector array 57, which includes one photodetector for each pixel of the pixel array 46. The pixel array 46 also includes a filter array 56, which is an array of color filters placed between the photodetector array 57 and the incident VLC light. The filter array 56 may include multiple different types of filters, for example a set of blue filters, a set of green filters and a set of red filters, as illustrated in FIG. 3.

The photodetector controller 55 is configured to selectively enable a set of pixels of the pixel array 46. The photodetector controller 55 may be configured to do so in response to a signal received from the processor 30 indicating which pixels to enable. Enabling a pixel in the pixel array 46 may include applying a voltage to a respective photodetector of the photodetector array 57 such that when light is absorbed by the photodetector a photocurrent is produced. By way of example and not limitation, the photodetector controller 55 may enable a set of pixels associated with a particular color and keep other pixels associated with other colors disabled.

The photodetector readout 58 is configured to receive detection signals from the pixel array 46 and perform initial processing of the detection signals. For example, the detection signals may be analog signals and the photodetector readout 58 is configured to convert the analog detection signal associated with each pixel of the pixel array 46 to digital information that may be used by processor 30.

The monochrome image sensor 50 includes a photodetector controller 60, the pixel array 51 and a photodetector readout 62. The pixel array 51 includes a photodetector array 61, which preferably includes one photodetector for each pixel of the pixel array 51. The pixel array 51 of the monochrome image sensor 50 differs from the pixel array 46 of the multi-color image sensor 45 in that a filter array is not included because the monochrome image sensor 50 does not discriminate between different colors of light.

As with the photodetector controller 55 of multi-color image sensor 45, the photodetector controller 60 of the monochrome image sensor 50 is configured to selectively enable a set of pixels of the pixel array 51. The photodetector controller may do so in response to a signal received from the processor 30 indicating which pixels to enable. Enabling a pixel in the pixel array 51 may include applying a voltage to a respective photodetector of the photodetector array 61 such that when light is absorbed by the photodetector a photocurrent is produced.

As with the photodetector readout 58 of the multi-color image sensor 45, the photodetector readout 62 is configured to receive detection signals from the pixel array 51 and perform initial processing of the detection signals. For example, the detection signals may be analog signals and the photodetector readout 62 is configured to convert the analog detection signal associated with each pixel of the pixel array 51 to digital information that may be used by processor 30.

The processor 30 is configured to determine a property of the light and determine the mode of operation of the device 10 based on the property of the light, wherein the mode of operation corresponds to a color discrimination capability of the image sensor 40 of the device 10. The processor 30 may determine the property of the light by detecting the property of the light using the image sensor 40 or by receiving information indicating the property of the light via the Wi-Fi transceiver 33 or the cellular transceiver 36.

The processor may be configured to determine the property of the light by controlling the at least one image sensor to capture an image. The processor 30 may be configured to process the image to determine a first portion of the image that corresponds to the light source and a second portion of the image that does not correspond to the light source. For example, the processor 30 may be configured to perform object detection techniques to determine which objects in the image correspond to a light source. The processor 30 may be configured to determine the property of the light based on the first portion of the image and/or the second portion of the image. For example, a relative brightness of the light source can be determined by comparing the brightness of the first portion of the image to the brightness of the second portion of the image. Alternatively, or additionally, a color of the light source can be determined by determining the predominant color of the first portion of the image.

In one example, the processor 30 is configured to determine a mode of operation based on a brightness of the light. The brightness of the VLC light registered by the device 10 may decrease as the user 11 moves away or turns away from the VLC light source. When the brightness of the light decreases, it becomes more difficult to accurately decode the encoded information. The processor 30 is configured to, in response to a determination that a mode-decision quantity based on the brightness is less than a threshold value, determine the mode of operation of the device to be a monochrome mode. The processor 30 is further configured to, in response to a determination that the mode-decision quantity is greater than the threshold value, determine the mode of operation of the device to be a multi-color mode. The monochrome mode and the multi-color mode correspond to different color discrimination capabilities because a monochrome image sensor cannot distinguish between light of different colors and a multi-color image sensor can distinguish between light of different colors. Operating the device 10 in a monochrome mode may increase the sensitivity of the VLC measurement relative to operating the device 10 in multi-color mode, allowing information to be extracted from the VLC signal even when the brightness of the light is decreased.

The threshold value can be a static threshold value or a dynamic threshold value. A static threshold value is a threshold value that is independent of the brightness of the light measured by the pixels in the image sensor. The static threshold value may be selected to be a value below which the information cannot be decoded from the VLC light. Example threshold values may be based on the parameters of the image sensor. A dynamic threshold value is a threshold value that is dependent on the brightness of the light measured by the pixels in the image sensor. For example, a dynamic threshold value may increase as the average brightness measured by all the pixels in the image sensor increases and decrease as the average brightness measured by all the pixels in the image sensor decreases. In this way, the dynamic threshold value can be proportional to the average brightness measured by the image sensor. In another example, the dynamic threshold value may be determined based on the VLC error rate determined from the decoded VLC signals.

Figure 5:
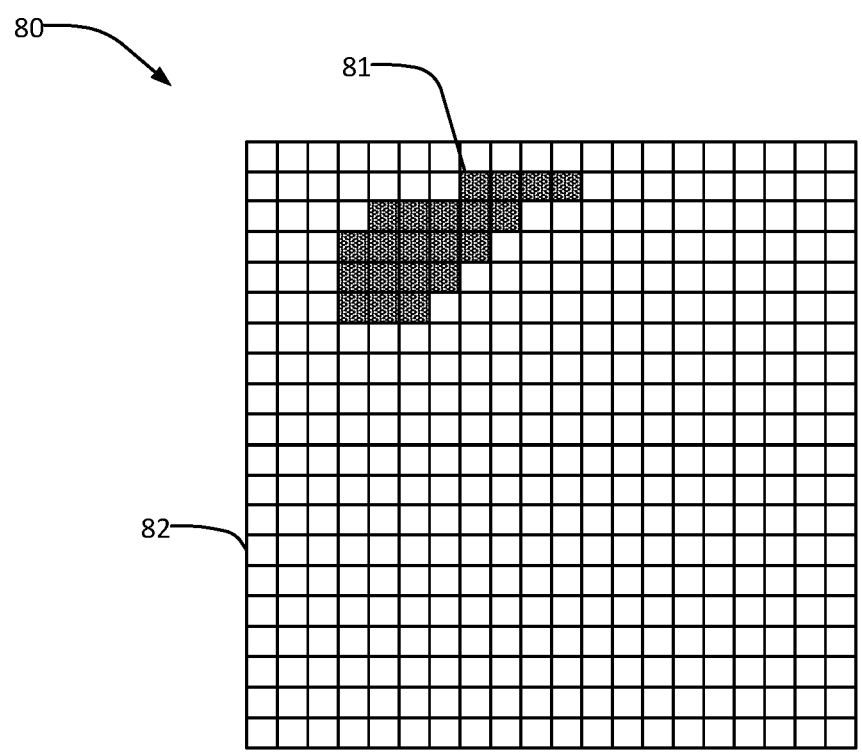
FIG. 5 is a pixel array of the image sensor of FIG. 2.

The processor 30 is configured to determine the mode-decision quantity by, for example, determining the average brightness of the entire pixel array, determining the average brightness of a group of pixels determined to be associated with the VLC light source, or determining a ratio of a brightness of a group of pixels determined to be associated with the VLC light source to another group of pixels. By way of example and not limitation, the processor 30 is configured to determine the mode-decision quantity by determining a brightness of the light based on the detection signals received from the pixels of the image sensor. The processor 30 is configured to process the detection signals to determine brightness values for each pixel of the image sensor. The processor 30 is further configured to determine a first group of pixels that correspond to a VLC light source and compare the brightness of the first group of pixels to a second group of pixels. The second group of pixels may be, for example, the remaining pixels of the image sensor that are not part of the first group of pixels or all the pixels in the pixel array. Referring to FIG. 5, an array of pixels 80 includes a first group of pixels 81 that the processor 30 determined to correspond to a VLC light source and a second group of pixels 82 that the processor 30 determined not to correspond to the VLC light source. The processor 30 is configured to determine the mode-decision quantity by taking the ratio of the average brightness of the first group of pixels 80 to the average brightness of the second group of pixels 81 (or the average brightness of all the pixels). The processor 30 is configured to determine, in response to a determination that the ratio of the brightness of the first group of pixels 80 to the average brightness of the second group of pixels 81 is less than the threshold value, that the device 10 should operate in a monochrome mode. Alternatively, the processor 30 may be configured to compare the average brightness of the first group of pixels 80 to the threshold to determine if the average brightness is less than or greater than the threshold value. In another example, the processor 30 is configured to determine a color of the VLC light. The color of the light may be determined in at least two different ways. First, the Wi-Fi transceiver 33 and/or the cellular transceiver 36 of the device 10 may be configured to receive an indication of the color of the light from the local transceiver 16. The color information for each light source of the VLC environment 1 may be sent to the device 10 as part of the assistance data along with the mapping data that is used by the device 10 to map particular VLC light source identifiers to a respective location. The processor 30 is configured to receive the indication of the color of the light from the Wi-Fi transceiver 33 and/or the cellular transceiver 36. Second, multi-color image sensor 45 and the processor may be configured to detect the color of the light. The multi-color image sensor 45 measures the brightness for each pixel, where different pixels correspond to different colors, as described above. As shown in FIG. 5, a first group of pixels 81 is associated with a VLC light source and a second group of pixels 82 is not associated with the VLC light source. The processor 30 is configured to determine which pixels of the pixel array 80 are in the first group of pixels 81. The processor 30 receives the brightness values from the multi-color image sensor 45 and determines the color of the light from the relative brightness of the different color pixels. For example, if the first group of pixels includes green pixels and blue pixels and the green pixels are brighter than the blue pixels, the processor 30 determines that the VLC light source is a green light source. Alternatively, instead of basing the determination of the color of the light source on the relative brightness of the different color pixels, the processor 30 may be configured to determine the color of the VLC light source based on the which pixels have the strongest VLC signal. For example, if the first group of pixels includes green pixels and blue pixels and the green pixels have a PWM signal with a greater amplitude than the PWM signal of the blue pixels, then the processor 30 determines that the VLC light source is a green light source. A determination based on the relative amplitudes of the PWM signal may be useful when the light fixture uses separate red, blue and green light LEDs to provide white light for illumination, but only encodes the VLC signal in the light emitted by the green LED.

The processor 30 is configured to determine the mode of operation in response to a determination of the color of the VLC light source. The processor 30 is configured to determine whether to enable a first set of pixels of a first color and disable a second set of pixels of a second color, or to enable the second set of pixels of the second color and disable the first set of pixels of the first color. The processor 30 is configured to, in response to the determination of which pixels to enable, send an indication to the photodetector controller 67 that only the photodetectors of the pixels that match the color of the VLC light should be enabled, while the pixels of different colors should be disabled. By enabling and disabling color-specific pixels, the processor 30 controls the operation of the multi-color image sensor such that the color determination capability of the multi-color image sensor is changed. For example, if the multi-color image sensor 45 includes green pixels (i.e., the first set of pixels of the first color) and blue pixels (i.e., the second set of pixels of the second color) and the processor 30 determined that the color of the VLC light is blue, then the processor enables the blue pixels and disables the green pixels. In this way, the multi-color image sensor will be more sensitive to the PWM of the VLC light because the VLC signal to noise ratio will be reduced by only using the pixels associated with the VLC and not using signals from pixels that detect light of a color different from the VLC signal.

Figure 6:
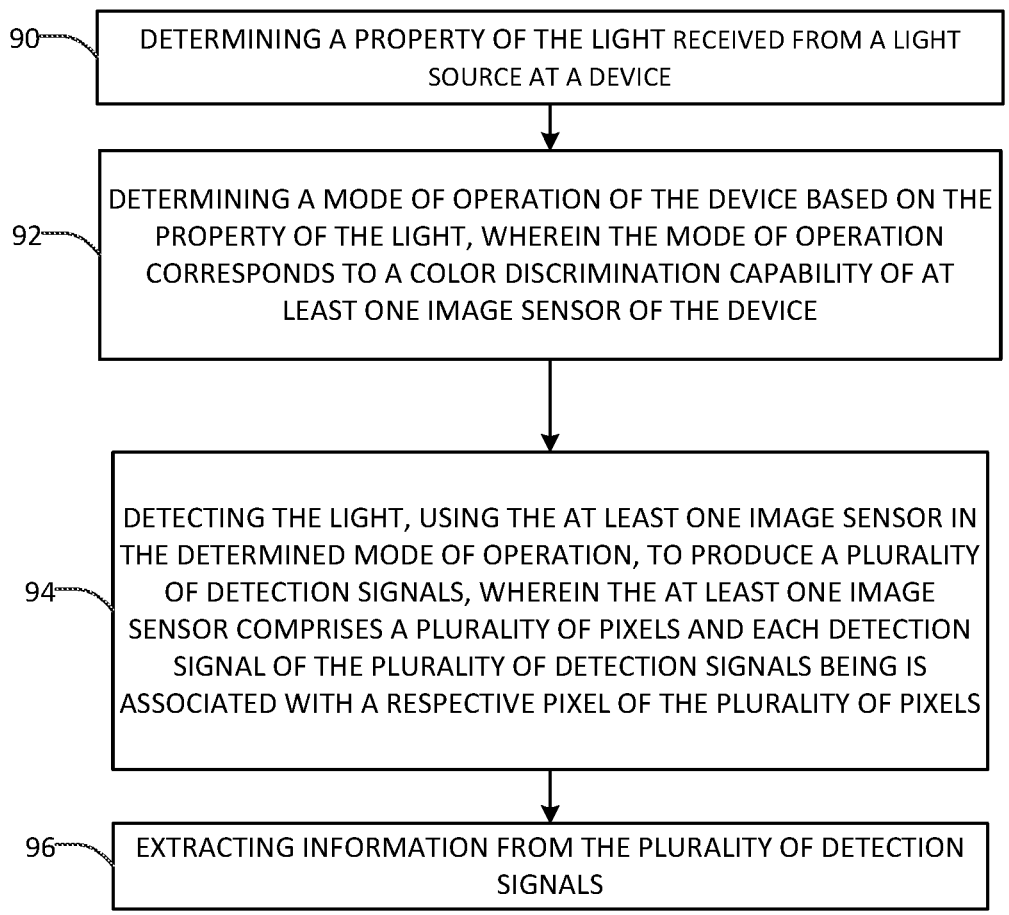
FIG. 6 is a flow chart of an example method of operating the device of FIG. 2.

The processor 30 is further configured to extract information from the detection signals associated with the multiple pixels of the image sensor. In the case where the VLC signal is encoded using PWM, the processor 30 is configured to perform a PWM analysis of the detection signals from the pixels associated with the VLC light source using conventional techniques to decode the PWM signal and extract the information Referring to FIG. 6, with further reference to FIGS. 1-6, a method 7 of operating a device 10 to process visible light signals, such as those used for VLC, based on light received from a light source includes the stages shown. The method 7 is, however, an example only and not limiting. The method 7 can be altered, e.g., by having stages added, removed, rearranged, combined, performed concurrently, and/or having single stages split into multiple stages.

At stage 90, the method 7 includes determining a property of the light received from the light source at the device. Stage 90 may be performed using the processor 30, the memory 31, the image sensor 40, the Wi-Fi transceiver 33 and/or the cellular transceiver 36. For example, the property of the light can be determined by receiving an indication of the property of the light from the local transceiver 16 by the device 10 (e.g., the processor 30 and the memory 31) through the transceiver 33 and the antenna 34 and/or through the transceiver 36 and the antenna 37. Also or alternatively, the property of the light may be determined by measuring the property of the light using the image sensor 40. Determining the property of the light may, for example, include determining the brightness (e.g., absolute and/or relative) of the light and/or determining the color of the light.

Determining the property of the light may include measuring a brightness of the light using the image sensor 40. By way of example and not limitation, the brightness of the light may be determined using the detection signals received from the image sensor 40. The detection signals may be processed to determine brightness values for each pixel of the image sensor 40. A first set of pixels that correspond to a VLC light source may be compared to a second set of pixels, which may be, for example, the remaining pixels of the image sensor that are not part of the first set of pixels, to determine relative brightness of the light measured by the first set of pixels.

Additionally, or alternatively, determining the property of the light may include determining a color of the light. By way of example and not limitation, the processor 3 determines the color of the light by receiving an indication of the color of the light in assistance data received from the local transceiver 16. In another example, the multi-color image sensor 40 measures the brightness of the light detected by pixels with different color filters and the relative brightness of the different color pixels is used by the processor 30 to determine which color of light is received, or determine which color(s) of light are not (significantly) received, etc. The processor 30 determines that a color of light was not significantly received if the detected brightness of that color is below an absolute threshold, or below a relative threshold (e.g., less than 10 times the brightness of another color received corresponding to a light source). The processor 30 can also determine the color of the light by determining the amplitude of the PWM signal used to encode the information in the light. If the amplitude of the PWM signal detected by a first set of colored pixels is greater than the amplitude of the PWM signal detected by a second set of colored pixels, then the processor 30 determines the color of the VLC light to be the same color as the first set of colored pixels.

Additionally, or alternatively, determining the property of the light may include capturing an image with the at least one image sensor. The processor 30 may process the image to determine a first portion of the image that corresponds to the light source and a second portion of the image that does not correspond to the light source. For example, object detection techniques may be used to determine which objects in the image correspond to a light source. The processor 30 determines the property of the light based on the first portion of the image and/or the second portion of the image. For example, a relative brightness of the light source can be determined by comparing the brightness of the first portion of the image to the brightness of the second portion of the image. Alternatively, or additionally, a color of the light source can be determined by determining the predominant color of the first portion of the image.

At stage 92, the method 7 includes determining a mode of operation of the device based on the property of the light, the mode of operation corresponding to a color discrimination capability of image sensor of the device. Stage 92 may be performed using the processor 30 and the memory 31. Determining the mode of operation may include determining whether to use a monochrome mode or a multi-color mode. For example, the processor 30 determines a mode-decision quantity based on the brightness of the VLC light. If the mode-decision quantity is less than a threshold value, the processor 30 determines the mode of operation of the device to be a monochrome mode. If the mode-decision quantity is greater than the threshold value, the processor 30 determines the mode of operation of the device to be a multi-color mode. The monochrome mode and the multi-color mode have different color discrimination capabilities, and operating the device 10 in a monochrome mode may increase the sensitivity of the VLC measurement relative to operating the device 10 in multi-color mode, allowing information to be extracted from the VLC signal even when the brightness of the light is decreased.

The processor 30 determines the mode-decision quantity by, for example, determining the average brightness of the entire pixel array, determining the average brightness of a group of pixels determined to be associated with the VLC light source, or determining a ratio of a brightness of a group of pixels determined to be associated with the VLC light source to another group of pixels. The processor 30 determines a first group of pixels is associated with the VLC light source and a second group of pixels is not associated with the VLC light source. The processor 30 compares the brightness of the two groups of pixels to determine the mode-decision quantity. For example, the processor 30 determines a ratio of the average brightness of the first group of pixels to the average brightness of the second group of pixels (or the average brightness of all the pixels). If the ratio of the brightness of the first group of pixels to the average brightness of the second group of pixels is less than the threshold value, the processor 30 determines the mode of operation to be the monochrome mode. If the ratio is greater than the threshold value, then the processor 30 determines the mode of operation to be the multi-color mode. Alternatively, the average brightness of the first group of pixels can be compared directly to the threshold value (without using a ratio with the brightness of the second group of pixels) to determine if the average brightness of the pixels associated with the VLC source is less than or greater than the threshold value.

Determining the mode of operation may additionally or alternatively include determining whether to enable a first set of pixels and disable a second set of pixels, or to enable the second set of pixels and disable the first set of pixels when the image sensor includes a multi-color image sensor that includes the first set of pixels for detecting light of a first color and the second set of pixels for detecting light of a second color. For example, when the processor 30 determines the VLC light used to encode the information is the first color, but not the second color, then the pixels for detecting light of the first color are enabled and the pixels for detecting light of the second color are disabled. By enabling and disabling color-specific pixels, the processor 30 controls the operation of the multi-color image sensor such that the color determination capability of the multi-color image sensor is changed.

At stage 94, the method 7 includes detecting the light, using the image sensor in the determined mode of operation, by generating a plurality of detection signals, the image sensor comprising a plurality of pixels and each detection signal of the plurality of detection signals being associated with a respective pixel of the plurality of pixels. Stage 94 may be performed using the processor 30, the memory 31, and/or the image sensor 40. In one example, the image sensor includes a monochrome image sensor and a multi-color image sensor. In this case, using monochrome mode includes using the monochrome image sensor to detect the VLC light, and using multi-color mode includes using the multi-color image sensor to detect the VLC light. In another example, the image sensor includes a single image sensor capable of acting as a monochrome image sensor and a multi-color image sensor. In this case, using monochrome mode includes using the single image sensor as a monochrome image sensor to detect the VLC light, and using multi-color mode includes using the single image sensor as a multi-color image sensor to detect the VLC light. When a multi-color image sensor is used, the mode of operation may also include enabling pixels of a first color and disabling pixels of a second color.

At stage 96, the method 7 includes extracting information from the plurality of detection signals. Stage 96 may be performed using the processor 30, the memory 31, and the image sensor 40. The information is extracted by decoding the VLC signal. For example, a PWM analysis of detection signals from pixels associated with the VLC light source may be performed to determine digital values that may be decoded into the information.

Other Considerations

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Further, more than one invention may be disclosed.

A wireless network is a communication system in which communications are conveyed wirelessly, i.e., by electromagnetic and/or acoustic waves propagating through atmospheric space rather than through a wire or other physical connection. A wireless network may not have all communications transmitted wirelessly, but is configured to have at least some communications transmitted wirelessly.

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions.

The processes, systems, and devices discussed above are examples. Various configurations may omit, substitute, or add various procedures or components as appropriate. For instance, in alternative configurations, the processes may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

What is claimed is:

1. A method of processing visible light signals, comprising:
   determining a property of light received from a light source at a device by processing an image of the light source to determine a first portion of the image that corresponds to the light source and a second portion of the image that does not correspond to the light source and determining a relative brightness of the light source by comparing the first portion of the image to the second portion of the image;
   determining a mode of operation of the device based on the property of the light based at least in part on the relative brightness of the light source, wherein the mode of operation corresponds to a color discrimination capability of at least one image sensor of the device;
   detecting the light, using the at least one image sensor in the determined mode of operation, to produce a plurality of detection signals, wherein the at least one image sensor comprises a plurality of pixels and each detection signal of the plurality of detection signals is associated with a respective pixel of the plurality of pixels; and
   extracting information from the plurality of detection signals.

2. The method of claim 1, wherein determining the mode of operation comprises determining whether to use a monochrome mode or a multi-color mode.

3. The method of claim 2, wherein:
   the at least one image sensor comprises a monochrome image sensor and a multi-color image sensor;
   detecting the light using the at least one image sensor in the monochrome mode comprises detecting light with the monochrome image sensor; and
   detecting the light using the at least one image sensor in the multi-color mode comprises detecting light with the multi-color image sensor.

4. The method of claim 2, wherein determining the property of the light comprises measuring a brightness of the light using the at least one image sensor.

5. The method of claim 1, wherein determining the property of the light comprises determining a color of the light.

6. The method of claim 5, wherein determining the property of the light comprises receiving an indication of the color of the light in assistance data received via a wireless transceiver of the device.

7. The method of claim 5, wherein determining the property of the light comprises determining the color of the light using the at least one image sensor.

8. The method of claim 1, wherein determining the property of the light comprises:
   capturing the image with the at least one image sensor.

9. A method of processing visible light signals, comprising:
   determining a property of light received from a light source, wherein determining the property of the light further comprises measuring a brightness of the light using the at least one image sensor and comparing a brightness of a first set of pixels associated with the light source with an average brightness of a second set of pixels;
   determining a mode of operation of the device based on the property of the light, wherein the mode of operation corresponds to a color discrimination capability of at least one image sensor of the device, and wherein determining the mode of operation comprises determining whether to use a monochrome mode or a multi-color mode;
   detecting the light, using the at least one image sensor in the determined mode of operation, to produce a plurality of detection signals, wherein the at least one image sensor comprises a plurality of pixels and each detection signal of the plurality of detection signals is associated with a respective pixel of the plurality of pixels; and
   extracting information from the plurality of detection signals.

10. A method of processing visible light signals, comprising:
    determining a property of light received from a light source at a device, wherein determining the property of the light comprises determining a color of the light using the at least one image sensor, wherein the at least one image sensor comprises a multi-color image sensor comprising a first set of pixels configured to detect light of a first color and a second set of pixels configured to detect light of a second color;
    determining a mode of operation of the device based on the property of the light, wherein the mode of operation corresponds to a color discrimination capability of at least one image sensor of the device, and wherein determining the mode of operation comprises determining whether to enable the first set of pixels and disable the second set of pixels, or to enable the second set of pixels and disable the first set of pixels;
    detecting the light, using the at least one image sensor in the determined mode of operation, to produce a plurality of detection signals, wherein the at least one image sensor comprises a plurality of pixels and each detection signal of the plurality of detection signals is associated with a respective pixel of the plurality of pixels; and
    extracting information from the plurality of detection signals.

11. A device to process visible light signals, the device comprising:

at least one image sensor configured to detect light from a light source in a mode of operation and generate a plurality of detection signals, wherein the at least one image sensor comprises a plurality of pixels and each detection signal of the plurality of detection signals is associated with a respective pixel of the plurality of pixels; and a processor, communicatively coupled to the at least one image sensor, wherein the processor is configured to:

determine a property of the light by processing an image of the light source to determine a first portion of the image that corresponds to the light source and a second portion of the image that does not correspond to the light source and determining a relative brightness of the light source by comparing the first portion of the image to the second portion of the image;

determine the mode of operation of the device based on the property of the light based at least in part on the relative brightness of the light source, wherein the mode of operation corresponds to a color discrimination capability of the at least one image sensor of the device; and extract information from the plurality of detection signals.

12. The device of claim 11, wherein the processor is configured to determine the mode of operation by determining whether to use a monochrome mode or a multi-color mode.

13. The device of claim 12, wherein the at least one image sensor comprises:

a monochrome image sensor configured to detect the light in response to a determination by the processor to use the monochrome mode; and a multi-color image sensor configured to detect the light in response to a determination by the processor to use the multi-color mode.

14. The device of claim 12, wherein the processor is configured to determine the property of the light by determining a brightness of the light based on the plurality of detection signals received from the at least one image sensor.

15. The device of claim 11, wherein the processor is configured to determine the property of the light by determining a color of the light.

16. The device of claim 15, further comprising a wireless transceiver configured to receive assistance data comprising an indication of the color of the light, and wherein the processor is configured to determine the color of the light based on the indication of the color of the light.

17. The device of claim 15, wherein the processor is configured to determine the property of the light by determining the color of the light based on the plurality of detection signals received from the at least one image sensor.

18. A device to process visible light signals, the device comprising:

at least one image sensor configured to detect light from a light source in a mode of operation and generate a plurality of detection signals, wherein the at least one image sensor comprises a plurality of pixels and each detection signal of the plurality of detection signals is associated with a respective pixel of the plurality of pixel; and a processor, communicatively coupled to the at least one image sensor, wherein the processor is configured to:

determine a property of the light, wherein the processor is further configured to determine a brightness of the light based on the plurality of detection signals received from the at least one image sensor and to compare a brightness of a first set of pixels associated with the light source with an average brightness of a second set of pixels;

determine the mode of operation of the device based on the property of the light, wherein the mode of operation corresponds to a color discrimination capability of the at least one image sensor of the device, and wherein the processor is further configured to determine whether to use a monochrome mode or a multi-color mode; and extract information from the plurality of detection signals.

19. A device to process visible light signals, the device comprising:

at least one image sensor configured to detect light from a light source in a mode of operation and generate a plurality of detection signals, wherein the at least one image sensor comprises a plurality of pixels and each detection signal of the plurality of detection signals is associated with a respective pixel of the plurality of pixels, and wherein the at least one image sensor comprises a multi-color image sensor comprising a first set of pixels configured to detect light of a first color and a second set of pixels configured to detect light of a second color; and a processor, communicatively coupled to the at least one image sensor, wherein the processor is configured to:

determine a property of the light, wherein the processor is configured to determine the property of the light by determining a color of the light;

determine the mode of operation of the device based on the property of the light, wherein the mode of operation corresponds to a color discrimination capability of the at least one image sensor of the device, and wherein the processor is configured to determine the mode of operation by determining whether to enable the first set of pixels and disable the second set of pixels, or to enable the second set of pixels and disable the first set of pixels; and extract information from the plurality of detection signals.

20. A device to process visible light signals, the device comprising:

at least one image sensor configured to detect light from a light source in a mode of operation and generate a plurality of detection signals, wherein the at least one image sensor comprises a plurality of pixels and each detection signal of the plurality of detection signals is associated with a respective pixel of the plurality of pixels; and a processor, communicatively coupled to the at least one image sensor, wherein the processor is configured to:

control the at least one image sensor to capture an image;

determine, based on the image, a first group of pixels of the plurality of pixels that correspond to the light source and a second group of pixels of the plurality of pixels that do not correspond to the light source;

determine a property of the light based on a comparison of a first portion of the image that corresponds to the first group of pixels to a second portion of the image that corresponds to the second group of pixels;

determine the mode of operation of the device based on the property of the light, wherein the mode of operation corresponds to a color discrimination capability of the at least one image sensor of the device; and extract information from the plurality of detection signals.

21. A device to process visible light signals, the device comprising:
property determining means for determining a property of light received from a light source comprising means for processing an image of the light source to determine a first portion of the image that corresponds to the light source and a second portion of the image that does not correspond to the light source and means for determining a relative brightness of the light source by comparing the first portion of the image to the second portion of the image;
mode determining means for determining a mode of operation of the device based on the property of the light based at least in part on the relative brightness of the light source;
detection means for detecting the light in the mode of operation and for generating a plurality of detection signals, wherein the detection means comprise a plurality of pixels and each detection signal of the plurality of detection signals is associated with a respective pixel of the plurality of pixels, and wherein the mode of operation corresponds to a color discrimination capability of the detection means; and
extracting means for extracting information from the plurality of detection signals.

22. The device of claim 21, wherein the mode determining means are for determining whether to use a monochrome mode or a multi-color mode.

23. The device of claim 21, wherein the property determining means is for determining the property of the light based on the plurality of detection signals received from the at least one image sensor.

24. The device of claim 21, further comprising receiving means for receiving assistance data comprising an indication of the property of the light, and wherein the property determining means is for determining the property of the light based on the indication of the property of the light.

25. The device of claim 21, wherein the property of the light is one of a brightness of the light or a color of the light.

26. The device of claim 21, wherein the detection means comprises:
a monochrome detection means for detecting the light in response to a determination by the mode determining means to use a monochrome mode; and
a multi-color detection means for detecting the light in response to a determination by the mode determining means to use a multi-color mode.

27. A non-transitory, processor-readable storage medium comprising processor-readable instructions configured to cause a processor of a device to:
determine a property of light received from a light source by processing an image of the light source to determine a first portion of the image that corresponds to the light source and a second portion of the image that does not correspond to the light source and determining a relative brightness of the light source by comparing the first portion of the image to the second portion of the image;
determine a mode of operation of the device based on the property of the light based at least in part on the relative brightness of the light source, wherein the mode of operation corresponds to a color discrimination capability of at least one image sensor of the device;
control the at least one image sensor to detect the light received from the light source in the determined mode of operation;
receive a plurality of detection signals from the at least one image sensor, wherein the at least one image sensor comprises a plurality of pixels and each detection signal of the plurality of detection signals is associated with a respective pixel of the plurality of pixels; and
extract information from the plurality of detection signals.

28. The non-transitory, processor-readable storage medium of claim 27, wherein the instructions configured to cause the processor to determine the mode of operation comprise instructions configured to cause the processor to determine whether to use a monochrome mode or a multi-color mode.

29. The non-transitory, processor-readable storage medium of claim 27, wherein the instructions configured to cause the processor to determine the property of the light comprise instructions configured to cause the processor to determine the property of the light based on the plurality of detection signals received from the at least one image sensor.

30. The non-transitory, processor-readable storage medium of claim 27, wherein the instructions configured to cause the processor to determine the property of the light comprise instructions configured to cause the processor to determine the property of the light based on assistance data comprising an indication of the property of the light received from a wireless transceiver of the device.

* * * * *